Jan. 30, 1962 W. E. ALTMANN 3,018,672
DIFFERENTIAL GEAR
Filed Aug. 26, 1957
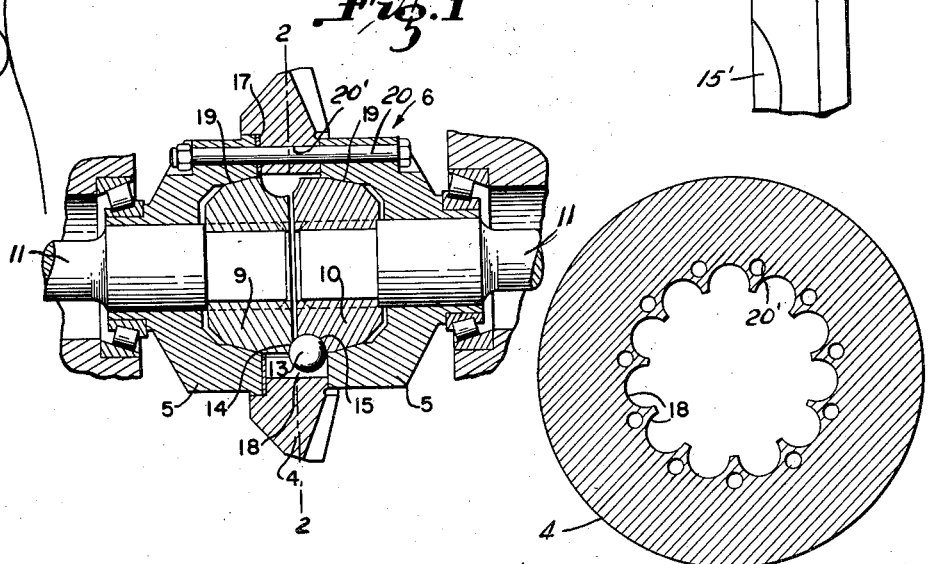
INVENTOR
WERNER E. ALTMANN
BY *Dicke and Craig*
ATTORNEYS United States Patent Office 3,018,672
Patented Jan. 30, 1962

3,018,672
DIFFERENTIAL GEAR
Werner E. Altmann, Stuttgart, Germany, assignor to Daimler-Benz Aktiengesellschaft, Stuttgart-Unterturkheim, Germany
Filed Aug. 26, 1957, Ser. No. 680,310
Claims priority, application Germany Sept. 1, 1956
15 Claims. (Cl. 74—650)

The present invention relates to a differential gear, especially for motor vehicles, in which the transmission of movement takes place by rolling bodies guided in sinusoidal channels or tracks.

Gears are known in the prior art in which the transmission of movement takes place by rolling bodies which are guided in sinusoidal channels or track. These types of gears are particularly favored in connection with differential gears. Balls are thereby used as rolling bodies which are able to roll along two sinusoidal channels or tracks intersecting each other. The sinusoidal tracks distinguish themselves from each other with respect to the angle or inclination due to a difference in the numbers of high and low points. The drive thereby takes place by means of the rolling bodies or balls themselves which are arranged in a separate driving cage at the points of intersection of both sinusoidal curves. The sinusoidal channels or tracks themselves are cut into the two driven members. The differential effect is obtained by the fact that the balls are able to displace themselves axially in the driving cage and thereby enable a relative movement of both driven members with respect to each other as a result of the different inclinations of the sinusoidal channels or tracks.

Differential gears of this type in the prior art ordinarily possess a complicated construction so that manufacture thereof, especially of the driven members for the balls with the sinusoidal tracks and of the ball cage, as well as assembly thereof, produce considerable difficulties.

The present invention aims at a simplification of the construction of differential gears thereof and its assembly is made simple and inexpensive without the necessity of complicated machining tools or work tools.

The problem, as mentioned hereinabove, is solved in accordance with the present invention by the use of a centrally arranged driving wheel which is completed on both sides thereof into a driving housing by means of sleeves secured thereto on both sides. The driven members are supported within the sleeves of the housing and are provided with sinusoidal channels or tracks while the rolling bodies, for example, balls, are guided in apertures extending axially through the driving gear.

In a preferred embodiment according to the present invention, both sleeves which complete the driving gear into a complete housing are arranged and constructed symmetrically. In connection therewith, the balls are surrounded by the apertures provided in the driving gear about only one-half the circumference thereof so that the apertures provided along the inner periphery of the driving wheel constructed in the shape of a crown or rim are provided as semi-spherically-shaped open pockets. The tracks of the sinusoidal curves in the driven member are thereby conformed to the shape of the balls in the axial cross section thereof whereby the tracks may also possibly have a somewhat larger radius than the balls.

The construction according to the present invention provides a differential gear having a constructively simple compact assembly which is fully enclosed. A separate ball cage may be dispensed with. As a result thereof, the number of the different necessary parts is reduced and the manufacture and maintenance of the bearings rendered less costly, especially as the two housing sleeves may be identical. The manufacture of the individual parts, especially, of the driving gear, is as simple as is the assembly of the entire gear.

Accordingly, it is an object of the present invention to provide a differential gear which may be manufactured relatively inexpensively, requires relatively few parts and may be readily assembled.

Still another object of the present invention resides in the provision and construction of a compact differential gear in which the movement is transmitted by means of rolling bodies guided along tracks having sinusoidal curves and which have all of the advantages emunerated hereinabove.

These and further objects, features and advantages of the present invention will become more obvious from the following description when taken in connection with the accompanying drawing which shows, for purposes of illustration only, two embodiments in accordance with the present invention and wherein:

FIGURE 1 is a cross-sectional view of a differential gear in accordance with the present invention;

FIGURE 2 is a cross-sectional view taken along line 2—2 of FIGURE 1 through the driving gear;

FIGURE 3 is a schematic illustration of the cooperation of the balls and sinusoidal tracks utilized in the present invention; and FIGURE 4 is a developed view of a part of one of the driven track members of FIGURE 1.

Referring now more particularly to the drawing wherein like reference numerals are used throughout the various views to designate like parts, and more specifically to FIGURE 1, reference numeral 4 designates the centrally-disposed driving gear which is completed into a driving housing generally designated by reference numeral 6 by means of the two sleeves 5, one of which is disposed on each side of the driving gear 4 and is secured thereto in any suitable manner, for example, by bolts in the manner illustrated in FIGURE 1. The housing assembly 6 consisting of driving gear 4 and sleeves 5 is supported as a unit by means of roller bearings 7 in an axle housing indicated in the drawing only schematically and designated therein by reference numeral 8, or may also be rigidly supported in any other suitable manner. The driving gear 4 may be constructed as bevel gear although it is also understood that it may also be in other forms.

The driven members 9 and 10 are secured for common rotation with the half axles 11, for example, by a spline arrangement, within the driving housing 6 and are supported with respect to the driving housing 6 by means of the half axles 11. The driving gear 4 is provided with openings 12 extending in the axial direction, in which balls 13 are arranged axially movable. The balls 13 are thereby retained at a predetermined radius by the openings 12. The driven members 9 and 10 are provided with tracks or channels 14 and 15 of sinusoidal curves which are disposed on both sides of the bores 12 of the driving gear 4. The rise or inclination of the sinusoidal curves is different so that, for example, the sinusoidal curve track 14 of the driven member 9 has five high and low points each whereas the sinusoidal curve track 15 of the driven members 10 has six high and low points each. As a result thereof, eleven points of intersection between the two sinusoidally curved tracks 14 and 15 are obtained having a constant distance from each other. Correspondingly, the driving gear 4 must also be provided with eleven apertures or openings 12 accommodating therein eleven balls 13. The rise or inclination of the sinusoidally curved tracks 14 and 15 may lie below the self-locking point as is well known per se.

The cooperation of the balls with the sinusoidal tracks may be made more clear by reference to FIGURE 4 in which the sinusoidal lines represent the respective tracks of the driven members, and in which the balls are pushed in the direction of the arrows by forces which would be applied by the driving gear of the illustrated constructions. The ball 13' in FIGURE 4 is force-locked between the sinusoidal tracks and applies a driving force to both tracks when there is no differential rotation of the driven tracks. Upon differential rotation of the tracks, different balls can assume the position of the ball 13', but there is at all times a driving force between the balls and the tracks.

According to the embodiment shown in FIGURES 1 and 2, the driving gear 4 is constructed as bevel gear. The apertures or openings 12 which receive balls 13 are provided along the inner periphery of gear 4. The apertures 12 surround the balls only along approximately one-half of the circumference thereof. Consequently, the apertures 12 form inwardly open pockets having a semi-circular cross section along the inner periphery of the crown-like constructed driving gear 4. The balls 13 are supported inwardly thereof by the driven members 9 and 10. The sinusoidally curved tracks 14 and 15 are conformed in the axial cross section thereof to the shape of the balls 13. However, they may also have a slightly larger radius than the balls 13.

The driving gear 4 is secured to the sleeves 5 by means of a plurality of bolts 20, only one of which is illustrated in the drawing, which bolts extend through the bores 20' in the gear 4 and through corresponding bores in the sleeves. The bolts 20 are located at a lesser distance from the rotational axis of the differential gear than the bottoms of the apertures 12, which define the limits of outward movement of the balls 13 radially from the differential gear axis. The tracks 14 and 15 are formed in the periphery of the driven members 9 and 10. In this construction of FIGURE 1, the driven members 9 and 10 may stand closely adjacent to each other since the driving member does not extend therebetween as in other constructions and, in this construction, the entire assemblage can be made more compact by enabling the ball paths to be located nearer the periphery of the housing defined by the sleeves 5 and the driving member 4 and by the location of the bolts generally intermediate the pockets 12 for the balls.

Operation

The cooperation of the balls with the sinusoidal tracks may be made more clear by reference to FIGURE 3 in which the sinusoidal lines represent the respective tracks of the driven members, and in which the balls are pushed in the direction of the arrows by forces which would be applied by the driving gear of the illustrated constructions. The ball 13 in FIGURE 3 is force-locked between the sinusoidal tracks and applies a driving force to both tracks when there is no differential rotation of the driven tracks. Upon differential rotation of the tracks, different balls can assume the position of the ball 13, but there is at all times a driving force between the balls and the tracks.

The operation of the differential gear illustrated in FIGURE 1 is as follows:

The driving gear 4 transmits the torque to the balls 13 which thereupon transmit the same to the two driven members 9 and 10 by the bearing contact thereof with the sinusoidally curved tracks 14 and 15. Normally, no relative movement takes place thereby between driven members 9 and 10. If the vehicle, for example, travels through a curve, an equalization of the number of rotations of the two driving members 9 and 10 with respect to each other may take place by the fact that the balls 13 may move axially in the apertures 12 whereby the driven members 9 and 10 are moved relative to each other as a result of the difference in rise or inclination in the sinusoidally curved tracks 14 and 15.

The gear may be constructed in a manner, known per se, so that the sinusoidally curved tracks are connected force-lockingly with the balls 13 only within the region of the ascending or rising branches thereof. The tracks may then be machined clear by a predetermined amount over the ball radius within the region of their points of reversal.

Furthermore, it is possible to cut off the mutually adjacent points of reversal of the sinusoidally curved tracks. As seen in FIGURE 4, the peaks or points of reversal of the sinusoidally curved track of the structure representing one of the driven members are cut off. The machining is thereby greatly simplified.

In many cases, it is desired to obtain a self-locking of the differential gear. For that purpose, the driven members 9 and 10 are provided along the outer circumference with conically shaped friction surfaces 19 which cooperate with correspondingly shaped friction surfaces in the sleeves 5 of the driving casing 6. Both driven members 9 and 10, as a result of the wedging action of the balls in the curved tracks 14 and 15, are pressed outwardly by the torque whereby the friction surfaces 19, which taper in opposite directions away from the driving gear 4 and the curve tracks 14 and 15, are also strongly pressed against the complementary surfaces in sleeves 5. Consequently, a relative movement of the driven members 9 and 10 with respect to the driving casing 6 and therewith with respect to each other is prevented.

A distance or spacer disk 17 is appropriately arranged between the driving gear 4 and one of the sleeves 5 to compensate for axial tolerances within the housing 6.

The half axles 11 may possibly be supported in the driving members 9 and 10 in a manner to be displaceable longitudinally, for example, by means of spline-groove arrangements provided with roller bodies. It is also possible to support the driven members 9 and 10 in the housing 6, not by means of half axles 11 but, for example, by means of an extended throat portion thereof.

While I have shown and described one embodiment in accordance with the present invention, it is understood that the same is not limited thereto but is susceptible of many changes and modifications within the scope of the present invention, and I intend to cover all such changes and modifications as encompassed by the appended claims.

I claim:

1. A differential gear particularly for motor vehicles comprising a centrally disposed driving gear provided with axially extending and radially inwardly facing openings, sleeve means secured on both sides of said driving gear to form therewith a unitary housing, driven members, means for supporting said driven members within said housing, each of said driven members being provided with a sinusoidally-shaped track, said tracks having respectively unequal numbers of high and low points, the portion of said driving gear which defines the radially inwardly facing openings being arranged to generally encircle the tracks of said driven members, and means including rolling bodies guided partially within said openings and in bearing contact with said tracks to transmit torque from said driving gear to said driven members while simultaneously therewith enabling differential adjustment between said driven members by axial movement of said rolling bodies in said openings.

2. A differential gear according to claim 1, wherein said rolling bodies are balls and said openings are formed along the inner periphery of said driving gear as inwardly open pockets thereby surrounding said balls only along an essentially semi-circular arc, said driven members extending adjacent each other centrally of said driving member and having said tracks formed in the peripheries thereof.

3. A differential gear according to claim 1, wherein said rolling bodies are balls and said sinusoidally-shaped tracks are conformed in axial cross section essentially to the shape of said balls.

4. A differential gear according to claim 3, wherein said sinusoidally-shaped tracks have a slightly larger radius than said balls.

5. A differential gear particularly for motor vehicles comprising a centrally disposed driving gear provided with axially extending and radially inwardly facing openings, sleeve means secured on both sides of said driving gear to form therewith a housing, driven members, means for supporting said driven members within said housing, said driven members being provided with track means having sinusoidal curves with an unequal number of high and low points in the respective tracks thereof, the portion of said driving gear which defines the radially inwardly facing openings being arranged to generally encircle the tracks of said driven members, and means including rolling bodies guided within said openings and in bearing contact with said track means to transmit torque from said driving gear to said driven members while simultaneously therewith enabling differential adjustment between said driven members by axial movement of said rolling bodies in said openings, said tracks being force-lockingly connected with said rolling bodies only within the region of the ascending branches thereof.

6. A differential gear according to claim 5, wherein said rolling bodies are balls and said sinusoidal-curve tracks are shaped with clearance beyond the ball radius by a predetermined amount within the region of the reversal points thereof.

7. A differential gear according to claim 6, wherein said sinusoidal-curve tracks are cut off within the region of the mutually adjacent reversal points to flatten the latter.

8. A differential gear according to claim 5, wherein said sinusoidal-curve tracks are cut off within the region of the mutually adjacent reversal points to flatten the latter.

9. A differential gear according to claim 1, further comprising a half axle for each driven member, and means for connecting each of said driven members to a respective half axle to enable relative axial movement therebetween including rolling bodies and splined connecting means therebetween.

10. A differential gear according to claim 1, wherein said sleeve means consist of two sleeves symmetrically arranged and constructed.

11. A differential gear particularly for motor vehicles comprising a centrally disposed driving gear provided with axially extending and radially inwardly facing openings, a sleeve member secured to each side of said driving gear to form therewith a unitary housing, a pair of driven members supported and enclosed within said housing, each of said driven members being provided with undulating track means encircling the axis of rotation of said driving gear, said tracks having unequal numbers of high and low points, the undulations of said track means being in the direction of said axis and means including rolling bodies guided within said openings for rotation about said axis with said driving gear and movable axially thereof, at least a part of said rolling bodies being in bearing contact with said track means to transmit torque from said driving gear to said driven members while simultaneously therewith enabling differential adjustment between said driven members by axial movement of said rolling bodies in said openings.

12. A differential gear particularly for motor vehicles comprising a centrally disposed driving gear provided with axially extending and radially inwardly facing openings, sleeve means secured on both sides of said driving gear to form therewith a unitary housing, driven members, means for supporting said driven members within said housing, each of said driven members being provided with a sinusoidally-shaped track, said tracks having an unequal number of high and low points, and means including rolling balls guided within said openings and in bearing contact with said track means to transmit torque from said driving gear to said driven members while simultaneously therewith enabling differential adjustment between said driven members by axial movement of said rolling balls in said openings, said sinusoidally-shaped tracks conforming in axial cross-section essentially to the shape of said balls and having a slightly larger radius than said balls, friction surfaces between each of said driven members and said housing, said sinusoidally-shaped tracks being provided with an inclination whereby said balls act thereon with force below the self-locking value for said friction surfaces.

13. A differential gear particularly for motor vehicles comprising a centrally disposed driving gear provided with axially extending and radially inwardly facing openings, sleeve means secured on both sides of said driving gear to form therewith a unitary housing, driven members, means for supporting said driven members within said housing, each of said driven members being provided with a sinusoidally-shaped track, said tracks having an unequal number of high and low points, means including rolling balls guided within said openings and in bearing contact with said track means to transmit torque from said driving gear to said driven members while simultaneously therewith enabling differential adjustment between said driven members by axial movement of said rolling balls in said openings, and means for locking said differential gear including a conically-shaped friction surface provided along the outer circumference of said driven members cooperating with complementary friction surfaces provided along the inside of said sleeve means.

14. A differential gear particularly for motor vehicles comprising a centrally disposed driving gear provided with axially extending and radially inwardly facing openings, a sleeve member secured to each side of said driving gear to form therewith a unitary housing, a pair of driven members supported and enclosed within said housing, each of said driven members being provided with undulating track means encircling the axis of rotation of said driving gear, said tracks having unequal numbers of high and low points, the undulations of said track means being in the direction of said axis and means including rolling balls guided within said openings for rotation about said axis with said driving gear and movable axially thereof, at least a part of said rolling balls being in bearing contact with said track means to transmit torque from said driving gear to said driven members while simultaneously therewith enabling differential adjustment between said driven members by axial movement of said rolling balls in said openings, and means for locking said differential gear including a conically-shaped friction surface on each of said driven members and cooperating complementary friction surfaces provided on the interior of said sleeve means, each of said conically-shaped surfaces tapering in the direction away from said driving gear.

15. A differential gear particularly for motor vehicles comprising a housing incorporating a centrally disposed driving gear and two sleeve means secured on opposite sides of said driving gear, said sleeve means and said driving gear being coaxial, driven members extending respectively into said sleeve means and supported for rotation with respect to said sleeve means, said driving gear having axially extending openings in angularly spaced relationship about its axis, said driven members being provided with track means having generally sinusoidal curves with an unequal number of high and low points in the respective tracks thereof, a plurality of balls for drivably interconnecting said driving gear and said driven members, said openings and the tracks of said driven members cooperating to define the paths of movement of said balls, there being only one ring of balls generally encircling said axis, said balls being at a uniform distance from said axis during operation of the differential but being movable along said axis in said openings to permit differential rotation of said driven members, and means including a plurality of bolts extending parallel to said axis for securing said sleeve means to said driving gear, said bolts being located to extend generally intermediate adjacent openings in said driving gear said bolts having intermediate portions at said driving gear lying closer to said axis than the outer surfaces of said balls at the bottoms of said openings.

References Cited in the file of this patent

UNITED STATES PATENTS

| | | |
|---|---|---|
| 1,282,614 | Miller | Oct. 22, 1918 |
| 2,720,796 | Schou | Oct. 18, 1955 |
| 2,821,936 | Lyeth | Jan. 28, 1958 |
| 2,837,936 | Fackler | June 10, 1958 |

FOREIGN PATENTS

| | | |
|---|---|---|
| 313,791 | Germany | July 19, 1919 |
| 801,421 | Germany | Jan. 8, 1951 |
| 852,208 | Germany | Oct. 13, 1952 |